United States Patent [19]

Hines

[11] 3,767,470

[45] Oct. 23, 1973

[54] THERMALLY COMPENSATED HEAT FLOW SENSORS

[76] Inventor: Frank F. Hines, RFD 1, Litchfield, N.H. 03051

[22] Filed: Sept. 20, 1971

[21] Appl. No.: 181,943

Related U.S. Application Data

[63] Continuation-in-part of Ser. No. 706,585, Feb. 19, 1968, Pat. No. 3,607,445.

[52] U.S. Cl. ............... 136/225, 136/227, 73/15 B
[51] Int. Cl. ............................................. H01v 1/04
[58] Field of Search ................ 136/227, 225, 233; 73/15 D, 15 A, 15 B

[56] References Cited
UNITED STATES PATENTS

| | | | |
|---|---|---|---|
| 839,985 | 1/1907 | Bristol | 136/227 |
| 3,066,177 | 11/1962 | Schneider et al. | 136/227 |
| 3,212,273 | 10/1965 | Nesselmann | 136/227 |
| 2,466,274 | 4/1949 | Ray | 136/227 |
| 2,304,489 | 12/1942 | Wetzel | 136/227 |
| 2,337,000 | 12/1943 | Ray | 136/227 |
| 1,289,116 | 12/1918 | Chubb | 136/225 |
| 2,694,098 | 11/1954 | Leins | 136/225 |
| 2,798,493 | 7/1957 | Sukacev | 136/225 |
| 3,427,209 | 2/1969 | Hager, Jr. | 136/225 |

FOREIGN PATENTS OR APPLICATIONS

| | | | |
|---|---|---|---|
| 751,758 | 7/1956 | Great Britain | 136/225 |
| 854,570 | 11/1960 | Great Britain | 136/233 |

Primary Examiner—Harvey E. Behrend
Attorney—C. Yardley Chittick et al.

[57] ABSTRACT

A thermally compensated heat flow sensor having n, unitary, planar, thermoelectric elements arranged to produce $n-1$ thermo-electric junctions where the number of elements "$n$" is an odd number of five or more. The Thermoelectric junctions can be arranged in series, parallel, or combinational configurations. Various geometrics are used to produce a substantially planar sensor having a very high junction density per unit area. At least three dissimilar thermoelectric materials are employed to provide thermal compensation.

6 Claims, 7 Drawing Figures

*INVENTOR.*
FRANK F. HINES

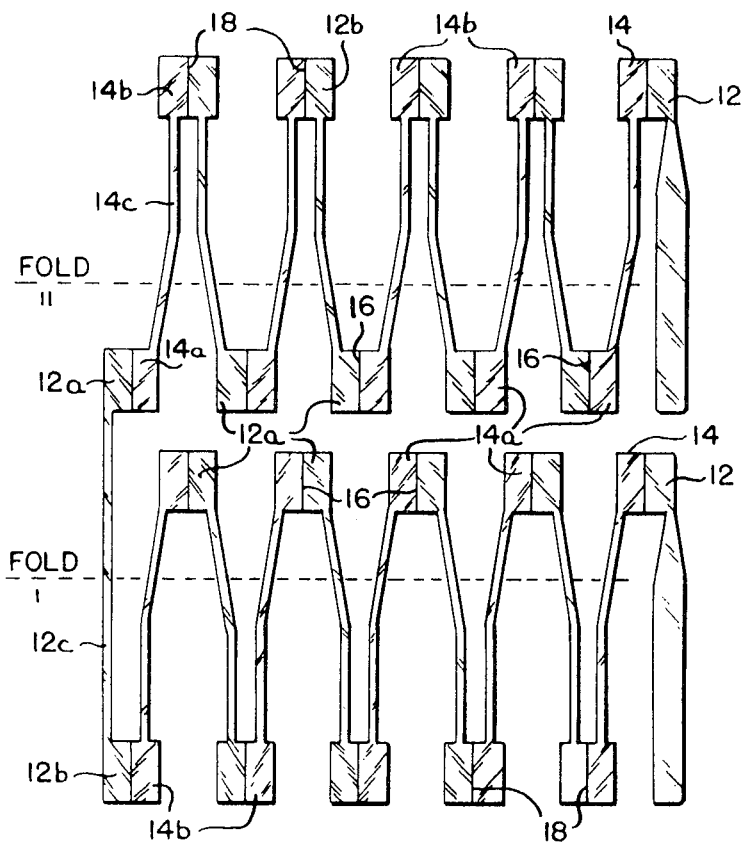
FIG. 6
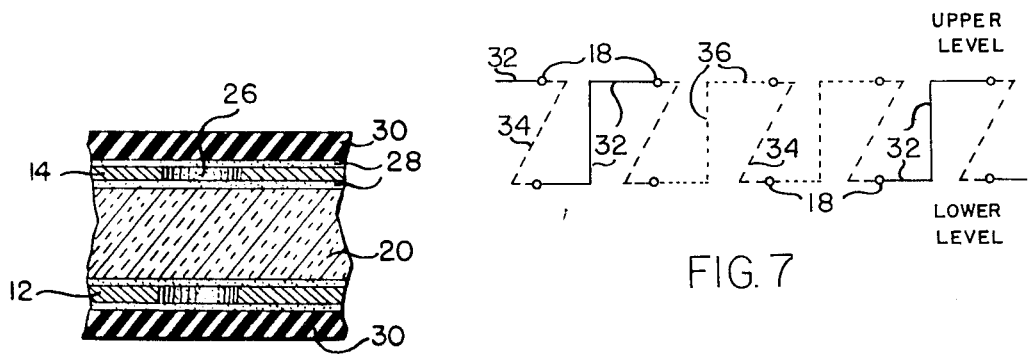
FIG. 5
FIG. 7
INVENTOR.
FRANK F. HINES

THERMALLY COMPENSATED HEAT FLOW SENSORS

This application is a continuation-in-part application of my previously filed application Ser. No. 706,585 filed Feb. 19, 1968 for Thermal Apparatus and now U.S. Pat. No. 3,607,445 issued Sept. 21, 1971.

BACKGROUND OF THE INVENTION

Recent developments in the thermal measuring and sensing field have demonstrated the feasibility of using very thin metallic foils of dissimilar thermoelectric materials to form a thermoelectric junction. A heat meter comprising two thermoelectric junctions formed from edge welded copper-constantan foil material and separated by a thin wafer of low density, compression resistant, thermal insulation has been described in the literature; N.E. Hager, Jr., "Thin Foil Heat Meter" *The Review of Scientific Instruments*, Vol. 36, No. 11, Nov. 1965. Further information on thin foil construction can be found in United States Patent Applications Ser. Nos. 456,700 and 483,738 entitled respectively, "Quick-Response, Heat-Sensing Element" and "Temperature Sensing Probe" filed by Nathaniel E. Hager, Jr. The latter application was issued on November 28, 1967 as United States Letters Patent No. 3,354,720.

The use of multiple, thermoelectric junctions connected in series, parallel or combinational configurations is also well known in the thermal instrumentation art. For instance, a plurality of thermoelectric junctions at the same thermal level can be employed to determine temperature when referenced to a known temperature. The same type of thermoelectric junctions can also be used to measure heat flow. If the thermoelectric junctions are series connected and positioned at different thermal levels, the resulting thermoelectric emf will be a fuction of the heat flow across the thermal barrier between the junctions.

Heat flow sensors composed of differential thermocouples and a thermal barrier where the thermocouples indicate the temperature difference through the barrier caused by heat flow normally will show a change in sensitivity (calibration) or output as sensor temperature under constant heat flow conditions due to change in thermoelectric power of the thermocouples as temperature and change in thermal conductivity of the thermal barrier with temperature.

It is accordingly, a general object of the invention to provide a thermally compensated heat flow sensor.

It is a specific object of the present invention to provide a plural junction, thermally compensated heat flow sensor which utilizes thin foil construction techniques.

It is a specific object of the present invention to provide a plural junction, thermally compensated heat flow sensor having $n$, unitary, planar, thermoelectric elements which are arranged to produce $n-1$ thermoelectric junctions where "$n$" is an odd number of five or more.

It is a feature of the invention that the unitary, planar, thermoelectric elements can be integrally fabricated by conventional methods and easily assembled into the desired plurality of thermoelectric junctions.

It is another object of the invention to provide a plural thermoelectric junction heat flow sensor by single, flat folding each planar, unitary, thermoelectric element around a sheet material which provides a thermal barrier between electrically alternating thermoelectric junctions.

It is another object of the present invention that the resulting folded, heat flow sensor is substantially planar in form and provides an extremely low packaging profile.

These objects and other objects and features of the present invention will best be understood from a detailed description of the preferred embodiments thereof, selected for purposes of illustration and shown in the accompanying drawings in which:

FIG. 5 is a view in cross-section of a portion of the assembled heat flow sensor showing the central thermal barrier, the folded thermoelectric elements adhesively bonded to the thermal barrier and outer electrically insulating protective members;

FIG. 6 is a plan view of an alternate embodiment of the heat sensor showing twenty thermoelectric junctions which are arranged to form ten differential thermocouples; and, FIG. 7 is a diagrammatic view of the thermally compensated heat flow sensor illustrating the use of three dissimilar thermoelectric materials to achieve the desired thermal compensation.

Figure 1:
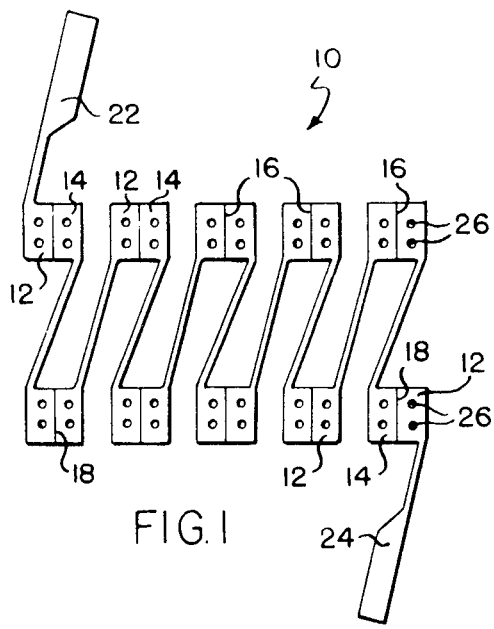
FIG. 1 is a plan view of a ten junction heat flow sensor shown in its flat, prefolded state.

Turning now to the drawings, and particularly to FIG. 1 thereof, there is shown in plan view a plural junction, thermo-electric apparatus or heat flow sensor constructed in accordance with the present invention and indicated generally by the reference numeral 10. The heat flow sensor 10 comprises alternating, unitary, planar thermoelectric elements 12 and 14 which are formed from dissimilar materials in the thermoelectric series, such as copper and constantan, iron and constantan, chromel and constantan, chromel and alumel, copper and gold-cobalt, silver and constantan, silver and gold-cobalt, platinum and 10 percent rhodium-platinum, platinum and 13 percent rhodium-platinum, etc. The use of three dissimilar thermoelectric materials to achieve thermal compensation of the heat flow sensor will be discussed below after first discussing the structure and configuration of the preferred thin foil versions of the heat flow sensor.

Figure 2:
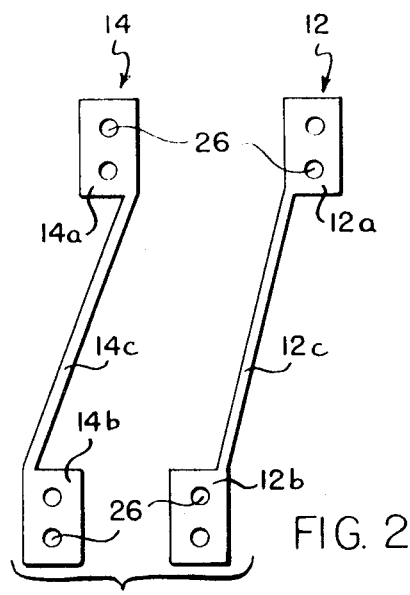
FIG. 2 is an enlarged view of two of the unitary, planar, thermoelectric elements of the heat flow sensor illustrated in FIG. 1.
Figure 3:
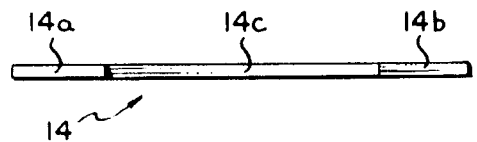
FIG. 3 is a side elevation of one of the thermoelectric elements shown in FIG. 2.

The thermoelectric elements 12 and 14 which are arranged to form the desired number of thermoelectric junctions are shown in enlarged plan view and in side elevation in FIGS. 2 and 3, respectively. Each thermoelectric element is characterized by a planar, unitary construction. The term "unitary" as used herein, means that each element is a single, continuous material without any joints, welds or other connections between individual components. The thermoelectric elements 12 and 14 are integrally formed from the selected thermoelectric material in sheet form by conventional fabricating techniques including cutting and acid etching. Alternatively, the thermoelectric elements can be vapor deposited on a suitable substrate. It is also possible to use electrically conductive paints and powdered thermoelectric materials in a binder. However, regardless of the particular method employed to produce the thermoelectric elements, it is important to note that in the preferred embodiment the elements are both unitary and planar.

Referring to FIGS. 1, 2, and 3, it can be seen that each unitary thermoelectric element 12 has three portions: a first thermoelectric portion 12a which, together with the corresponding first thermoelectric portion 14a of element 14, forms a thermoelectric junction 16; a second thermoelectric portion 12b which forms another thermoelectric junction 18 together with thermoelectric portion 14b; and an intermediate connection portion 12c. The corresponding connecting portion for thermoelectric element 14 is identified by the reference number 14c.

The thermoelectric junctions 16 and 18 are formed from the physical contact between the dissimilar end portions 12a–14a and 12b–14b, respectively. Preferably, the thermoelectric portions 12a–14a and 12b–14b are butted together and edge welded to produce a low resistance thermoelectric junction. However, other joining methods can be employed to form the junction. For example, a small section of each end portion 12a–14a and 12b–14b can be overlapped and spot welded together.

If the thermoelectric elements 12 and 14 are edge welded together, the resulting structure, as shown in FIGS. 1 through 3, will be substantially planar and, when folded around a suitable thermal barrier 20 (FIG. 4), will provide an extremely low packaging profile. The relative thinness of each thermoelectric element permits a very rapid response time for the thermal apparatus 10. Typical dimensions using copper and constantan metal foils are as follows: foil thickness, 0.0002 inch – 0.0005 inch; area of each end portion 12a–14a and 12b–14b, 0.01 to 0.0001 square inches; thermal barrier thickness, 0.0002 inch – 0.010 inch. The substantially planar configuration of the structure will be apparent when one considers that the length of the folded junctions, as indicated by the letter "a" in FIG. 4, is one half inch.

A number of different materials having a relatively high thermal resistance can be used for the thermal barrier 20. High temperature polymers or laminates are suitable. The polymides, such as Amoco AI polymer or DuPont "KAPTON" film, can be used to provide the thermal barrier between the electrically alternating thermoelectric junctions 16 and 18. Glass silicon laminates and various ceramics are also suitable materials for the barrier 20.

It will be appreciated that the physical configuration of the thermal barrier 20 can take a variety of forms. Preferably, the barrier 20 has at least one straight edge around which each connection portion 12c and 14c is folded in a single, flat fold without twisting. By utilizing unitary thermoelectric elements, it is possible to form a plurality of thermoelectric junctions and, hence, a plurality of differential thermocouples connected as a thermopile in a single folding operation. This arrangement greatly simplifies the construction of such thermopile with a concomitant reduction in the cost of assembly.

Figure 4:
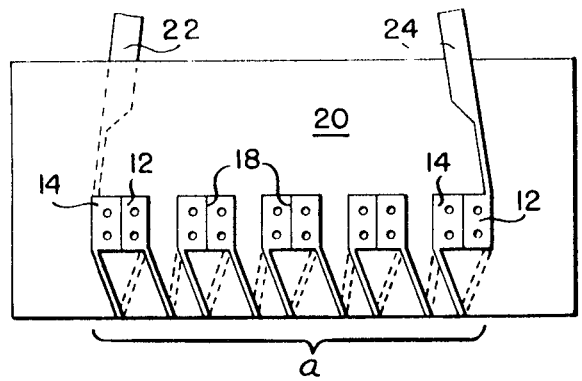
FIG. 4 is a plan view of the heat flow sensor of FIG. 1 showing the lower thermoelectric junctions folded over a sheet of insulating material.

Looking at FIGS. 1 and 4, it can be seen that there are eleven thermoelectric elements which form ten thermoelectric junctions. When these elements are folded, as shown in FIG. 4, five series connected differential thermocouples are formed with the thermoelectric junctions alternating both physically and electrically. In general terms, the preferred version of the plural junction heat flow sensor can be described as having $n$, unitary, planar thermoelectric elements arranged to form $n-1$ thermoelectric junctions where the number of elements "$n$" is an odd number of five or more. However, as will be discussed below, thermal compensation can be obtained with three dissimilar thermoelectric materials arranged to produce two junctions, one on each side of the thermal barrier.

The single fold construction illustrated in FIG. 4 produces a compact, substantially thermopile. thermpile. The thermoelectric emf of the thermopile is taken from output tabs 22 and 24 which, preferably, are integrally formed in the two end thermoelectric elements 12. Suitable wire leads, not shown, can be attached to the tabs 22 and 24 by conventional methods including soldering and fusion or spot welding.

The thermoelectric elements 12 and 14 are normally adhesively bonded to the thermal barrier 20. A variety of high temperature adhesives can be used including, epoxies, phenolics, silicones, and polymides. Preferably, one or more apertures 26 are provided in each thermoelectric portion 12a,b and 14a,b of the thermoelectric elements to improve the bonding. Looking at the cross-sectional view of FIG. 5, it can be seen that the adhesive 28 penetrates through the aperture 26 to insure a tight bond between the elements 12 and 14 and the thermal barrier 20. The outer surface of each thermoelectric element is bonded by the adhesive 28 to an electricaly insulative protective cover sheet 30. The cover sheet can be formed from a variety of materials including polyimide films, adhesive impregnated glass paper, and films sold by E.I. DuPont de Nemours under the tradenames "KAPTON" and "MYLAR".

Higher thermoelectric junction density per sensor unit area can be achieved by using other physical configurations. One such configuration is illustrated in FIG. 6 which depicts a ten thermocouple unit. In accordance with the above-stated formula, the number of thermoelectric elements is twenty-one giving twenty thermoelectric junctions ($n = 21$, $n-1 = 20$).

The ten thermocouple unit illustrated in FIG. 6 is produced by double folding along the dashed fold lines identified in the drawing as "Fold I" and "Fold II". For purposes of clarity, the thermal barrier 20 and cover sheets 30 have been omitted from the Figure. However, it will be understood that the folds would usually be made around the parallel edges of the thermal barrier. In other words, the dashed fold lines also represent the edges of the thermal barrier.

When the lower group of thermoelectric elements is folded at fold line 1, the thermoelectric elements 12b and 14b which form thermoelectric junctions 18 will overlie the corresponding elements 12a and 14a which form junctions 16. Similarly, when fold 2 is made the upper group of thermoelectric elements which form junctions 18 will overlie the corresponding elements which form junctions 16, thus producing ten series connected, differential thermocouples in a relatively small area with a thin profile. It will be appreciated that in contrast to the folded structure shown in FIG. 4, the thermoelectric junctions 16 and 18 which form each differential thermocouple are electrically alternating, but not physically alternating.

The preceding discussion has dealt with the preferred thin film construction for a heat flow sensor. I will now describe the thermally compensated version of a heat flow sensor in general, and more particularly, a thermally compensated thin film heat flow sensor.

It is well known that the generated EMF vs. temperature relationship of conventional thermocouples is not linear and that extensive tables, such as NBS 561 are necessary for the conversion of thermocouple output data to temperature. This means that the thermoelectric power, defined as millivolts per °F change, varies with temperature.

It is also known that the voltage output of a differential thermocouple having a constant differential temperature, $\Delta T$, will change substantially as the temperature of the two junctions increase or decrease. If thin foil thermocouples are used in a heat flow sensor as described above in conjunction with a thermal barrier the sensitivity of the sensor, assuming a constant $\Delta T$, will change with temperature. Since the thermal conductivity of the thermal barrier also changes with temperature, it is only necessary that the change in thermal conductivity match the change in thermoelectric power to produce a compensated heat flow sensor having essentially constant sensitivity over a wide range of temperature. For instance, DuPont "H Film" has approximately 11 percent increase in thermal conductivity from 70° to 300°F. Therefore, for a constant heat flux, the $\Delta T$ across a barrier of "H Film" will decrease approximately 11 percent for the same temperature change.

If the thermocouples are iron-constantan, the thermoelectric power will increase by approximately 9 percent between 32° and 300°F. The increase would be somewhat less based on 70°F instead of 32°F. Thus, a combination of "H Film" and iron-constantan thermocouples will be self compensating approximately 2 percent (11 percent–9 percent) over the range of temperatures given above.

By selecting the right combination of materials, a substantial degree of compensation between thermoelectric power and thermal conductivity of the heat barrier can be obtained. Since the thermal barrier is normally a laminate of some polymer combined with glass cloth, fiber, paper or other material, the thermal conductivity characteristics vs. temperature can be controlled to a certain extent by the selection of materials or by the percentage of each incorporated in the laminate. Various mineral or other fillers, such as aluminum oxide powder, quartz powder, carbon black, "cab-o-sil," and zirconia powder, can also be added to the glass cloth-polymer, or paper-polymer laminate to change the thermal conductivity characteristics.

The degree of compensation obtained depends upon how well the change in thermal conductivity of the thermal barrier vs. temperature matches the thermoelectric power vs. temperature of the thermocouple combination. When perfectly compensated, the heat flow sensor as a whole has an output depending only upon the rate of heat flow and independent of the temperature range. Other thermocouple material can be used including the examples mentioned previously.

It has been previously mentioned that heat flow sensors composed of differential thermocouples and a thermal barrier where the thermocouples indicate the temperature difference through the barrier caused by heat flow normally will show a change in sensitivity (calibration) or output vs. sensor temperature under constant heat flow conditions due to change in thermoelectric power of the thermocouples vs. temperature and change in thermal conductivity of the thermal barrier with temperature. Extensive tests of heat flow sensors composed of a thermal barrier, such as Kapton or Nomex, and butt-bonded foil thermocouples of single and multiple junction pairs have shown that the calibration does in fact change with a change in the average temperature of the sensor, and that a certain degree of compensation is obtained by using thermocouples whose thermoelectric power increases with increases in temperature in combination with a thermal barrier whose thermal conductivity increases with an increase in temperature. Perfect compensation is obtained when the two characteristics, change in thermoelectric power and change in thermal conductivity vs. temperature, are similar and the changes cancel each other.

There are only a limited number of suitable thermocouple materials and thermal barrier materials available for the construction of heat flow sensors. The better metallic thermocouples are copper-constantan, iron-constantan, chromel-alumel, and chromel-constantan. Use of any of the above requires a thermal barrier having very specific thermal conductivity properties if perfect compensation is to be achieved. The selection or manufacture of such a thermal barrier material having all the other necessary properties does not appear practical at the present time. However, partial compensation is easily obtained, for instance, copper-constantan thermopile has a change of thermoelectric power of about 15 percent per 100°F at room temperature, but a heat flow sensor of copper-constantan and Kapton (formerly called "H Film") will have a change of sensitivity of about 5 percent to 8 percent at 100°F.

Improved temperature compensation of calibration vs. temperature can be obtained by using a thermopile composed of three or more different thermoelectric materials. Basically, this involves the control of the change in thermoelectric power vs. temperature of the thermopile in order to match the change in thermal conductivity vs. temperature of the thermal barrier over some selected temperature range. For example, a copper-constantan thermopile and a Nomex thermal barrier produces a heat flow sensor having a positive temperature coefficient of sensitivity of approximately 5 percent per 100°F from 70°F to 200°F. A similar sensor made of chromel-constantan thermopile and Nomex thermal barrier will have a negative temperature coefficient of sensitivity of approximately 10 percent per 100°F over the same range of temperature.

A thermopile composed of ⅔ copper-constantan junction pairs and ⅓ chromel-constantan junction pairs, provides further compensation because the positive coefficient of the copper-constantan cancels the negative coefficient of the chromel-constantan. Other combinations of materials can also be used such as copper-constantan and iron-constantan or chromel-alumel and chromel-constantan.

Although it is desirable to have copper as one element in the thermopile because extension lead wires are normally copper, it is not a necessity. For example, successful sensors have been made with copper leads and chromel-constantan, iron-constantan thermopiles.

The use of three dissimilar thermoelectric materials to obtain thermal compensation of a heat flow sensor is illustrated diagrammatically in FIG. 7. For purposes of clarity, the thermal barrier 20 has been omitted from FIG. 7. However, it should be understood that the "upper level" thermoelectric junctions 18 are on one side of the thermal barrier and that the "lower level" junctions 18 are on the other side of the barrer. C*It also should be understood that the thermal barrier can comprise a single, unitary element as shown in FIG. 4, or a plurality of separate thermal barrier elements in near or abutting relation. Singularly or collectively, these thermal barrier elements constitue a thermal barrier means.)

The three different thermoelectric materials are identified by the reference numerals 32,34 and 36 and are represented in FIG. 7 by the solid, dashed and dotted lines, respectively. Various combinations of thermoelectric materials can be used as mentioned above. By way of illustration only, thermoelectric material 32 can be copper, while thermoelectric materials 34 and 36 are constantan and chromel, respectively.

It should be noted that in the heat flow sensor configuration shown in FIG. 7, the input lead material is copper. However, this is not necessary.

The FIG. 7 thermally compensated heat flow sensor utilizes ten thermoelectric junctions. A minimum of four such junctions is required in order to use the same material for both input leads and one of the thermoelectric materials. If the input lead material does not comprise one of the thermoelectric materials in the heat flow sensor, thermal compensation can be achieved with three dissimilar thermoelectric materials connected to form two thermoelectric junctions positioned on opposite sides of the thermal barrier.

It will be appreciated from the preceding description that thermal compensation in any heat flow sensor is obtained by using at least three different thermoelectric materials to form the thermoelectric junctions. Preferably, the thermally compensated heat flow sensor is constructed with the thin foil material previously described. However, the invention is not limited to such construction techniques. Similarly, although the preferred version utilizes $n-1$ thermoelectric junctions where "$n$" is an odd number of five or more, the thermal compensation can be achieved with only two thermoelectric junctions.

Having described in detail the preferred embodiment of my invention, it will now be apparent that numerous modifications can be made without departing from the scope of the present invention as claimed in the following claims.

What I claim and desire to secure by Letters Patent of the United States is:

1. A thermally compensated heat flow sensor comprising:
   1. thermal barrier means defining first and second thermal levels by the passage of heat through the thermal barrier means;
   2. first, second and third thermoelectrically dissimilar thermoelectric elements;
   3. means for serially connecting said elements to form a plurality of thermoelectric junctions, said thermoelectric elements being connected in the following order: first-to-second, second-to-third, third-to-second, and second-to-first, with the first-to-second and third-to-second connections being positioned at said first thermal level and forming plus-to-minus thermoelectric junctions and with the second-to-third and second-to-first connections being positioned at said second thermal level and forming minus-to-plus thermoelectric junctions;
   4. output means electrically connected to said first thermoelectric elements; and,
   5. wherein the combination of the thermal barrier means and the first and second thermoelectric elements and the combination of the thermal barrier means and the second and third thermoelectric elements have opposite temperature coefficients.

2. The heat flow sensor of claim 1 further characterized by said thermoelectric elements being series connected to form $n-1$ thermoelectric junctions where n is an odd number of five or more.

3. The heat flow sensor of claim 2 wherein said first, second and third thermoelectrically dissimilar thermoelectric elements comprise, copper, constantan and chromel, respectively.

4. The heat flow sensor of claim 3 wherein said $n-1$ thermoelectric junctions comprise substantially two-thirds copper and constantan junction pairs and substantially one-third chromel and constantan junction pairs.

5. The heat flow sensor of claim 1 wherein said thermoelectric elements are each unitary and planar.

6. The heat flow sensor of claim 5 wherein said thermoelectric elements are edge welded at each thermoelectric junction.

* * * * *